United States Patent [19]

Franco et al.

[11] Patent Number: 4,797,295
[45] Date of Patent: Jan. 10, 1989

[54] METHOD OF MAKING STICK-SUPPORTED MOLDED ICE CREAM WITH UNDERCUT PORTIONS

[75] Inventors: Grigoli Franco; Trabacchi Franco, both of Milano, Italy

[73] Assignee: Sidam S.R.L., Cormano, Italy

[21] Appl. No.: 57,226

[22] Filed: Jun. 1, 1987

[30] Foreign Application Priority Data

Jun. 6, 1986 [IT] Italy ................. 20707 A/86

[51] Int. Cl.⁴ .............................................. A23G 9/26
[52] U.S. Cl. .................................. 426/421; 426/134; 426/144; 426/515; 426/389; 264/318; 264/334; 264/310; 425/126.2; 249/59
[58] Field of Search ............... 426/515, 421, 134, 91, 426/144, 389; 249/59, 92, 93, 94, 96, 97, 117, 120, 127; 425/126 S; 264/318, 334, 310; D1/102–105, 106, 125

[56] References Cited

U.S. PATENT DOCUMENTS

| D. 230,905 | 3/1974 | Bair ........................ D1/102 |
| D. 230,907 | 3/1974 | Bair ........................ D1/102 |
| D. 230,908 | 3/1974 | Bair ........................ D1/102 |
| 1,658,564 | 2/1928 | MacDonald ................ 264/318 |
| 1,887,993 | 11/1932 | Conner et al. ............ 264/318 |
| 1,944,571 | 1/1934 | Rahm .................... 425/DIG. 58 |
| 1,966,877 | 7/1934 | Witte ...................... 264/318 |
| 2,100,985 | 11/1937 | Smally ..................... 425/125 |
| 2,363,808 | 11/1944 | Sayre ...................... 425/577 |
| 2,408,629 | 10/1946 | Green ...................... 264/334 |
| 2,766,123 | 10/1956 | Moubayed ................. 426/134 |
| 2,911,121 | 11/1959 | Glass ...................... 425/117 |
| 3,150,222 | 9/1964 | Blaustein et al. ........... 264/334 |
| 3,584,092 | 6/1971 | Alexandris ................ 264/318 |
| 3,646,190 | 2/1972 | Spyra ..................... 264/334 |
| 3,651,185 | 3/1972 | Menkel .................... 264/334 |
| 3,905,416 | 9/1975 | Hammer ................... 264/318 |
| 4,104,411 | 8/1978 | Pooler ..................... 426/421 |
| 4,546,615 | 10/1985 | Gram ...................... 426/421 |

FOREIGN PATENT DOCUMENTS

| 1011006 | 11/1948 | France ................... 264/318 |
| 46-14140 | 4/1971 | Japan .................... 264/318 |
| 517750 | 8/1939 | United Kingdom ....... 425/DIG. 58 |

*Primary Examiner*—Steven Weinstein
*Attorney, Agent, or Firm*—Michael J. Striker

[57] ABSTRACT

A method of making stick-supported products, particularly ice creams, having undercut or recessed zones formed thereon, the method utilizing a mold (1) which has at least one internal raised thread (2) and one recessed thread (3) and which enables the product to be drawn out of the mold by merely exerting an axially directed pull upon the product-supporting stick (5) followed by a natural rotational movement of the stick in a direction of said threads.

2 Claims, 1 Drawing Sheet

METHOD OF MAKING STICK-SUPPORTED MOLDED ICE CREAM WITH UNDERCUT PORTIONS

BACKGROUND OF THE INVENTION

This invention relates to a method of producing stick-supported ice creams having undercut or recessed portions, to a mold for carrying the method into effect, and to a produce obtained thereby.

Ice creams having undercut or recessed portions have been produced hitherto by utilizing either rigid molds that are openable for allowing the product to be removed, or flexible rubber-type molds which are tipped in order to remove the product.

The former molds mentioned above are too much complicate in construction and expensive whereas the latter have proved rather inefficient because of their being subjected to rapid wearing.

SUMMARY OF THE INVENTION

The object of this invention is to provide a method of making stick-supported ice creams having particularly designed undercut or recessed portions, which method is easy to carry out and does not require use to be made of rigid, openable molds or rubber molds.

The method of producing stick-supported ice creams according to the invention is characterized in that it comprises the steps of utilizing a rigid mold having at least one internal raised thread formed thereon, introducing a product in liquid state along with its supporting stick into said mold and, when freezing of the product has been achieved, removing the product from the mold by exerting an upwardly directed pull upon the stick, accompanied by a natural rotational movement of same stick.

The utilized mold is of cylindrical or truncated-cone shape and is made from a metal material.

The stick-supported ice cream obtained by this method will in turn have a corresponding cylindrical or truncated-cone shape and at least one recessed thread formed thereon.

One preferred embodiment of the method of producing stick-supported ice creams according to the invention, and a product obtained by said method, will now be described by way of e nonlimiting example with reference to the accompanying drawings,

DESCRIPTION OF THE PREFERRED EMBODIMENTS

With reference to the above figures, shown at 1 is a mold utilized by the method according to this invention.

The mold 1 is rigid in character and is manufactured from a metal material, for example, nickel or steel material.

Figure 1:
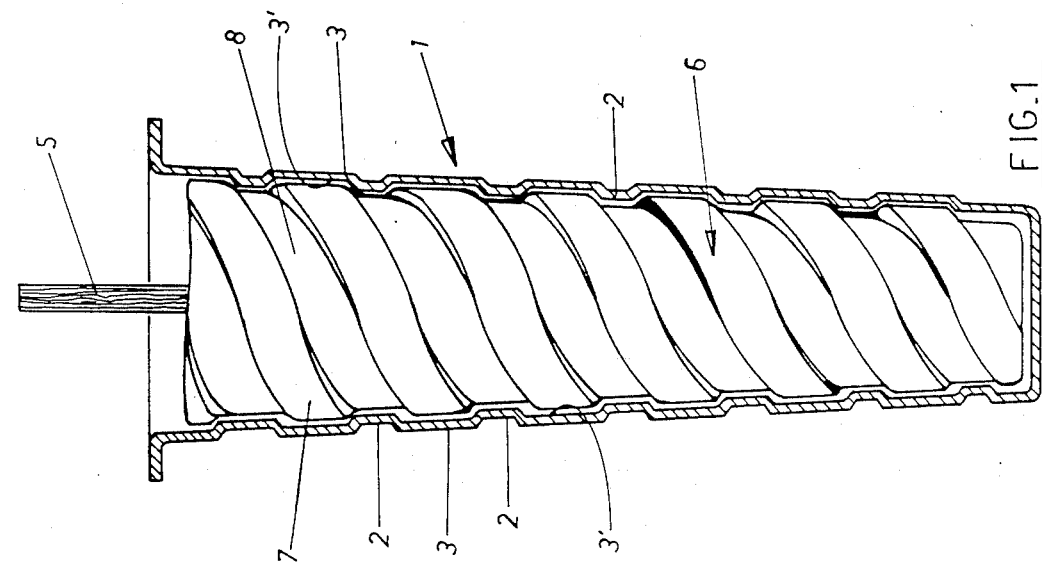
FIG. 1 is a middle sectional view of a mold utilized by the method of the invention, the mold being shown with the product contained therein prior to drawing-out of this latter.

In the example of FIG. 1, the mold is shown to be of a slightly truncated-cone shape with an open upper base, and has a series of internal raised threads 2 alternating with external raised threads 3 which latter result in corresponding recessed threads 3' on the inside of the mold.

Figure 2:
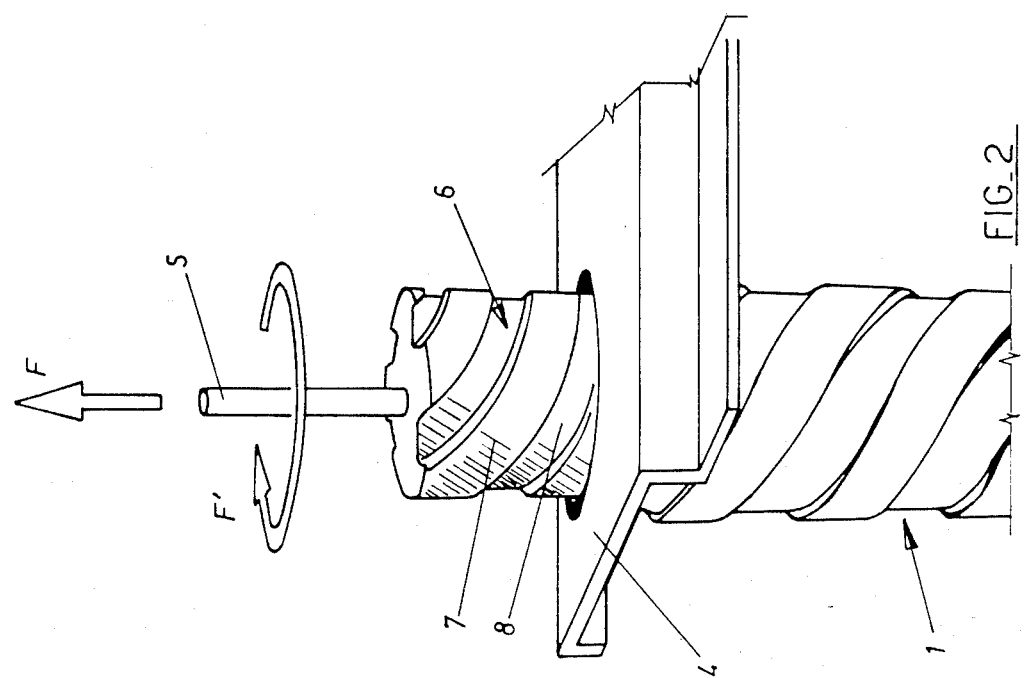
FIG. 2 is an axonometric partial view showing the product while being drawn out of the mold, the thread on the mold being depicted in an opposite direction to that in FIG. 1.

The molds 1 are normally arranged in rows on a machine for making ice creams and are supported by means of an appropriate mold frame that is designated by the reference numeral 4 in FIG. 2.

These molds are filled with ice-cream product in liquid state and subjected to cooling to cause the product to freeze. Prior to freezing, a stick 5 is inserted into the product-containing mold so that a stick-supported ice cream 6 is obtained when freezing is complete.

In order to draw the product 6 out of the mold 1 it is sufficient to exert an upwardly directed pull upon the stick 5 (see arrow F, FIG. 2) by means of suitable drawing pincers which are able to elastically close around the stick 5 thereby allowing for a natural rotational movement thereof in the sense of arrow F' as a result of the screw-coupling relationship between the product 6 and the mold 1.

The ice cream 6 is, in fact, provided on its external surface with raised thread-like zones 7, corresponding to the recessed zones 3' inside the mold 1, and with recessed thread-like zones 8 corresponding to the internal raised zones 2 of the mold.

When a stick 5 of round cross-section is used as shown by the drawing, the stick is enabled to rotate freely between the pincer means, as mentioned above.

When a flat stick is used, pad-type clamps will be utilized which are carried by the drawing pincers and which firmly hold the end of the stick 5 to rotate with it during the product drawing-out operation.

While a specific embodiment of the invention has been disclosed herein above and shown in the accompanying drawing, many changes as to the details of construction may be made thereto without departing from the spirit and scope of the invention.

We claim:

1. A method of making a stick-supported ice-cream comprising the steps of providing a single-piece rigid mold having on an internal surface thereof alternating internally raised and recessed threads, filling the rigid mold with an ice-cream in a liquid state, inserting a stick into said ice-cream, then solidifying said ice-cream in said mold to produce a stick-supported ice-cream having on the external surface thereof alternating externally raised and recessed threads and applying external means to said stick and pulling upon said stick in an axial direction of said mold while allowing said stick to rotate such that said pulling action is assisted by a natural movement exerted on said stick-supported ice-cream by virtue due to a cooperation between the threads of said mold and said stick-supported ice-cream so that said ice-cream is easily removed from the mold.

2. The method according to claim 1, wherein the solidifying is effected by freezing the product in the rigid mold.

* * * * *